United States Patent
Ballester

(10) Patent No.: US 9,290,336 B2
(45) Date of Patent: Mar. 22, 2016

(54) VARIABLE WIDTH CENTRAL ALIGNMENT SYSTEM WITH BLOCKING OF REVERSE AND FORWARD MOVEMENT OF TRUCKS FOR LOADING BAYS

(75) Inventor: Miguel Angel Iglesias Ballester, Barcelona (ES)

(73) Assignee: AMISERRU, S.L., Barcelona (ES)

( * ) Notice: Subject to any disclaimer, the term of this patent is extended or adjusted under 35 U.S.C. 154(b) by 629 days.

(21) Appl. No.: 13/515,702

(22) PCT Filed: Nov. 29, 2010

(86) PCT No.: PCT/ES2010/070783
§ 371 (c)(1),
(2), (4) Date: Jul. 23, 2012

(87) PCT Pub. No.: WO2011/092356
PCT Pub. Date: Aug. 4, 2011

(65) Prior Publication Data
US 2012/0282069 A1    Nov. 8, 2012

(30) Foreign Application Priority Data

Jan. 29, 2010    (ES) .................................. 201030118

(51) Int. Cl.
  *B65G 69/34*    (2006.01)
  *B65G 69/00*    (2006.01)
  *B65G 69/28*    (2006.01)
(52) U.S. Cl.
  CPC ............ *B65G 69/005* (2013.01); *B65G 69/006* (2013.01); *B65G 69/2882* (2013.01)
(58) Field of Classification Search
  CPC ............................. B65G 69/005; B65G 69/006

USPC .......................................... 414/396, 401, 584
See application file for complete search history.

(56) References Cited

U.S. PATENT DOCUMENTS

| | | | | |
|---|---|---|---|---|
| 3,710,524 | A | * | 1/1973 | Seiz .................................. 52/174 |
| 4,469,277 | A | * | 9/1984 | Howes .......................... 238/10 R |
| 4,746,258 | A | * | 5/1988 | Loomer et al. ................ 414/401 |
| 5,971,692 | A | | 10/1999 | Rae |
| 2005/0226705 | A1 | * | 10/2005 | Wilson .......................... 414/401 |

FOREIGN PATENT DOCUMENTS

| | | | | |
|---|---|---|---|---|
| CA | 2276512 A1 | * | 12/2000 | .......... B65G 69/006 |
| EP | 0357087 | | 3/1990 | |
| EP | 0919496 | | 6/1999 | |
| EP | 2380833 A1 | * | 10/2011 | .......... B65G 69/005 |
| FR | 2750123 A1 | * | 12/1997 | .......... B65G 69/005 |
| FR | 2841546 | | 1/2004 | |
| WO | WO 01/43526 A2 | * | 6/2001 | .......... B65G 69/005 |

* cited by examiner

*Primary Examiner* — James Keenan
(74) *Attorney, Agent, or Firm* — Leason Ellis LLP

(57) ABSTRACT

The system comprises at last one longitudinal guide that is independent of the loading bay and disposed on one side of the vertical mid-plane of the loading bay, facing the plane defined by the loading bay and associated with actuating means that trigger the lateral movement thereof, forming a reference for guiding the truck as it is maneuvered towards the loading bay. At least one of the longitudinal guides comprises a vertical post including illuminated signalling means and detectors for detecting the height and width of the truck approaching the loading bay, as well as moveable wedges associated with actuating means for blocking the truck in the loading bay.

15 Claims, 5 Drawing Sheets

Figure 1:
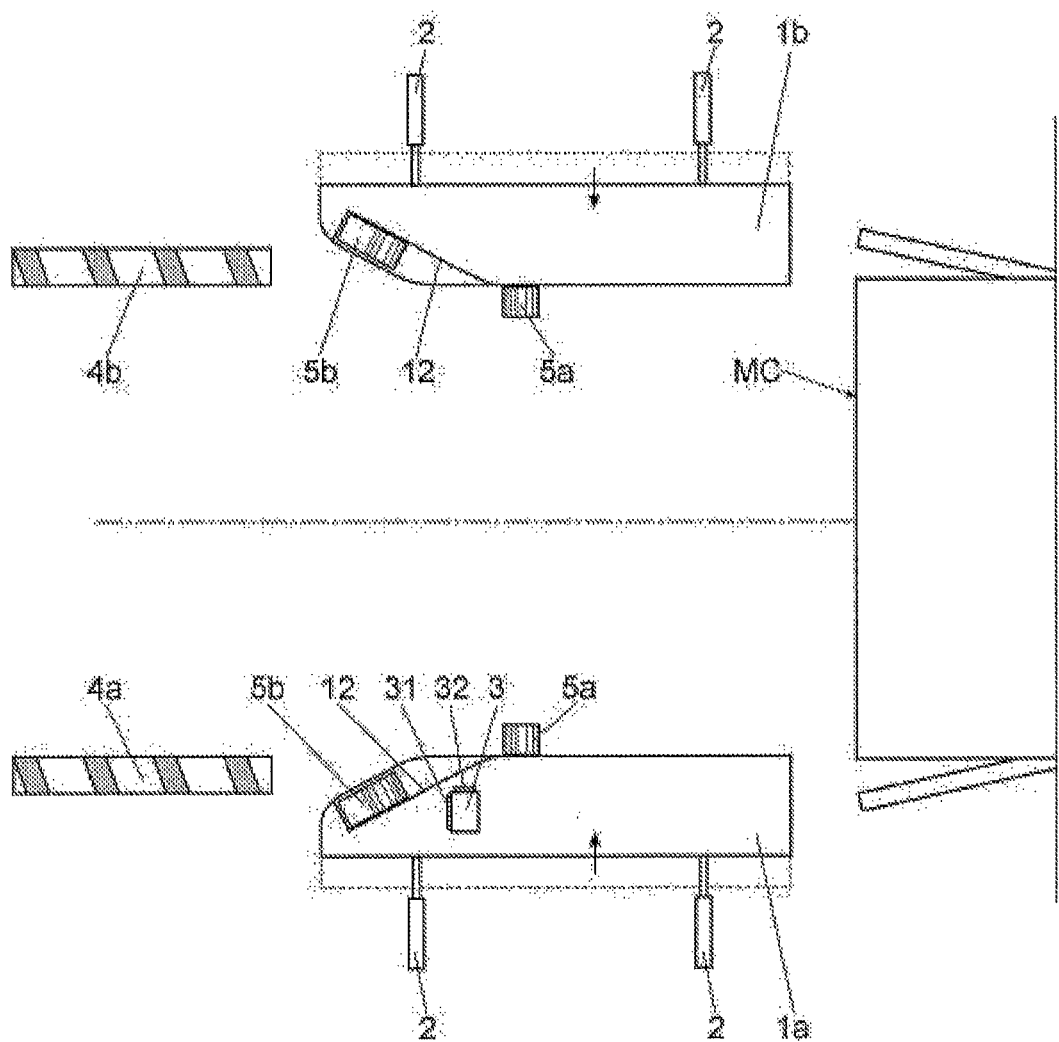
Figure 2:
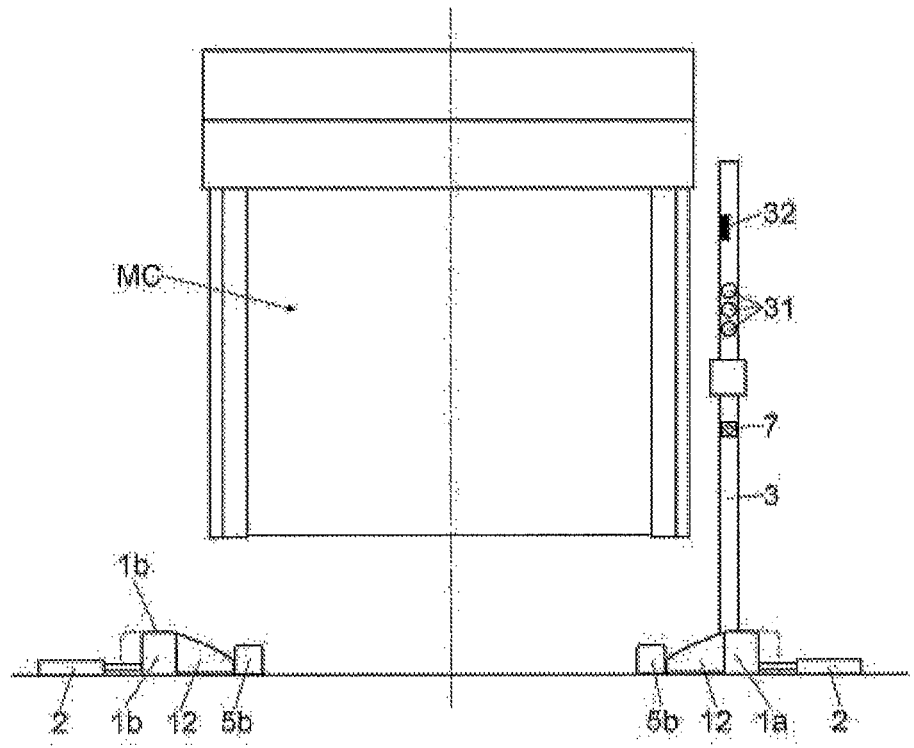
Figure 3:
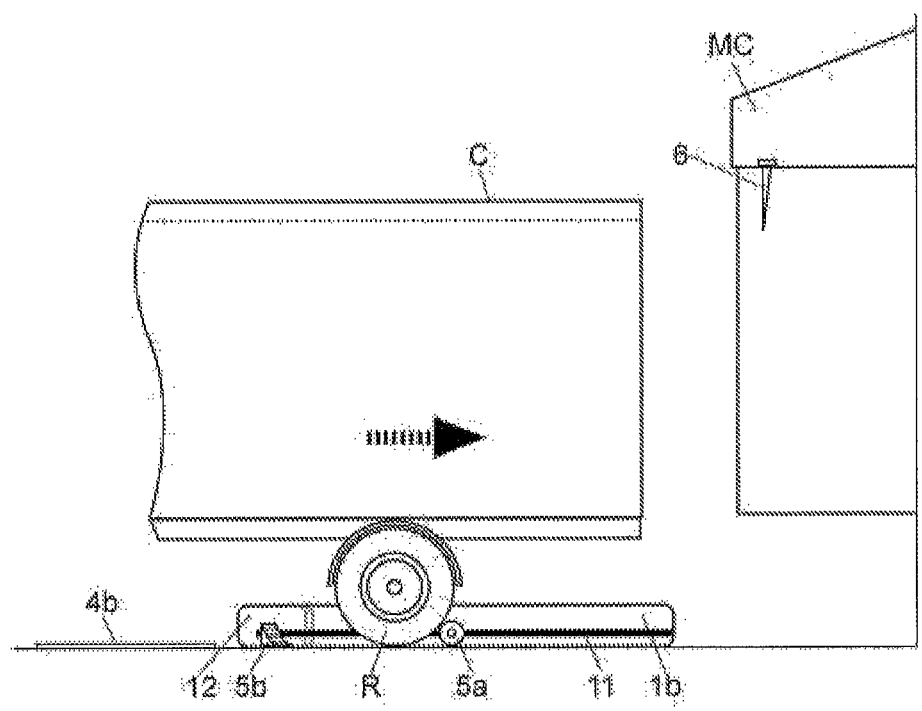
Figure 4:
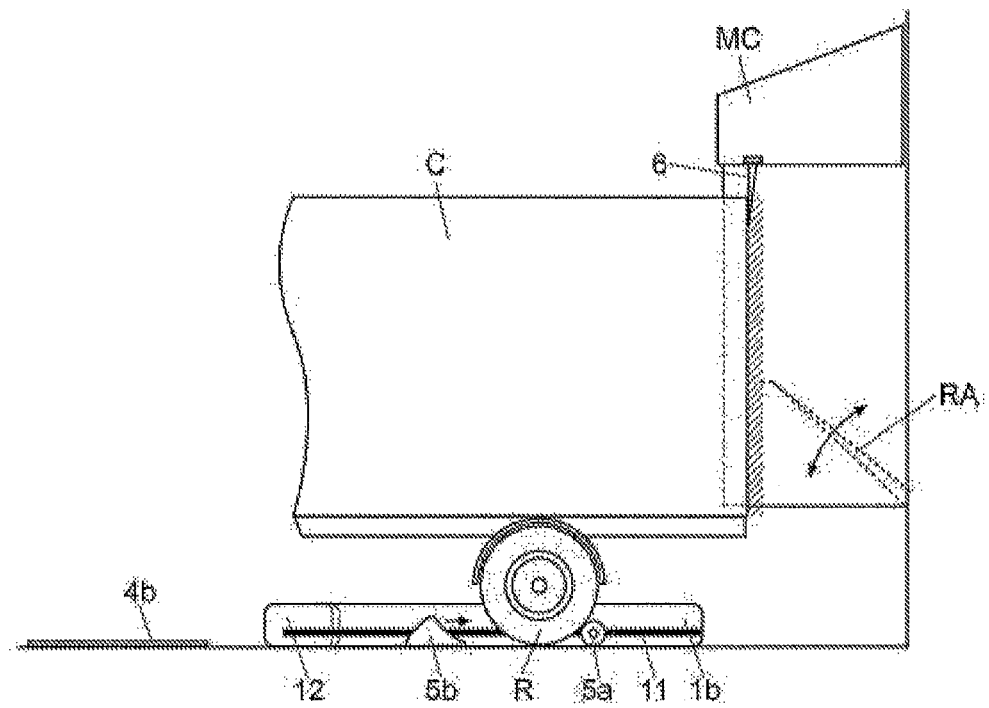
Figure 5:
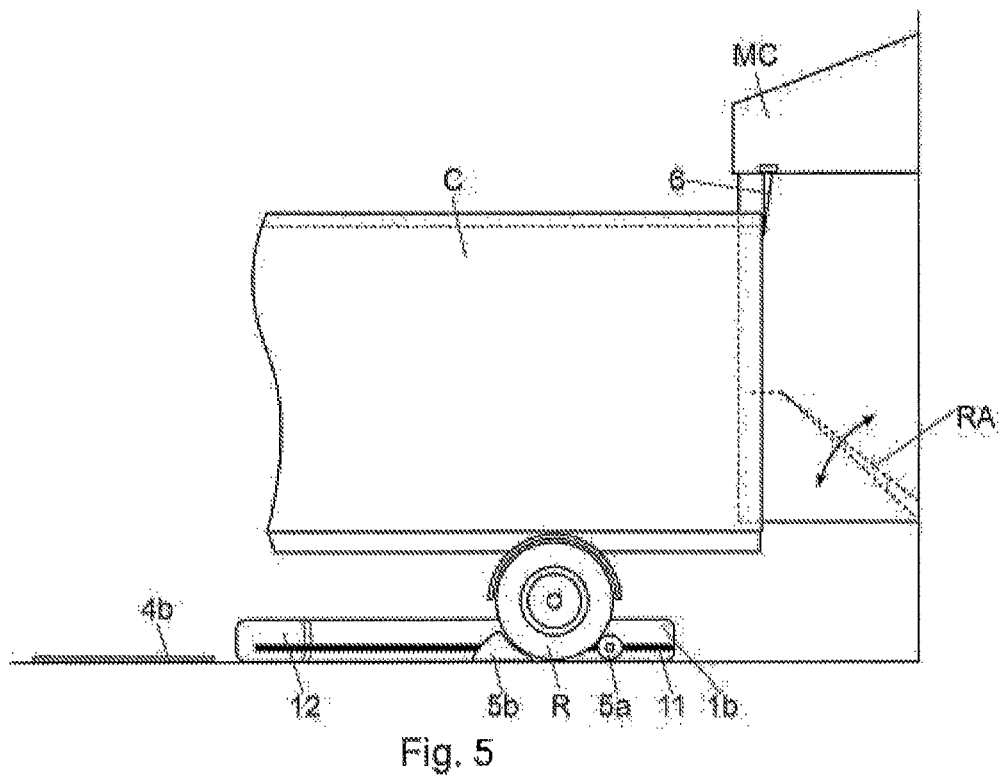
Figure 6:
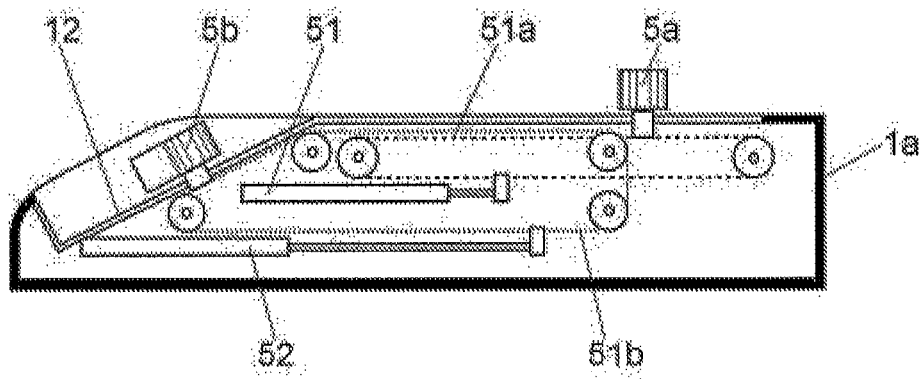
Figure 7:
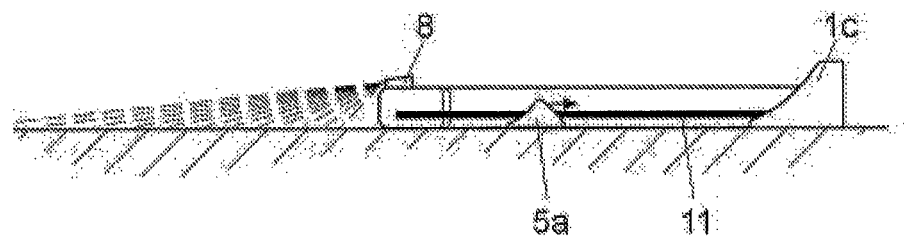
Figure 8:
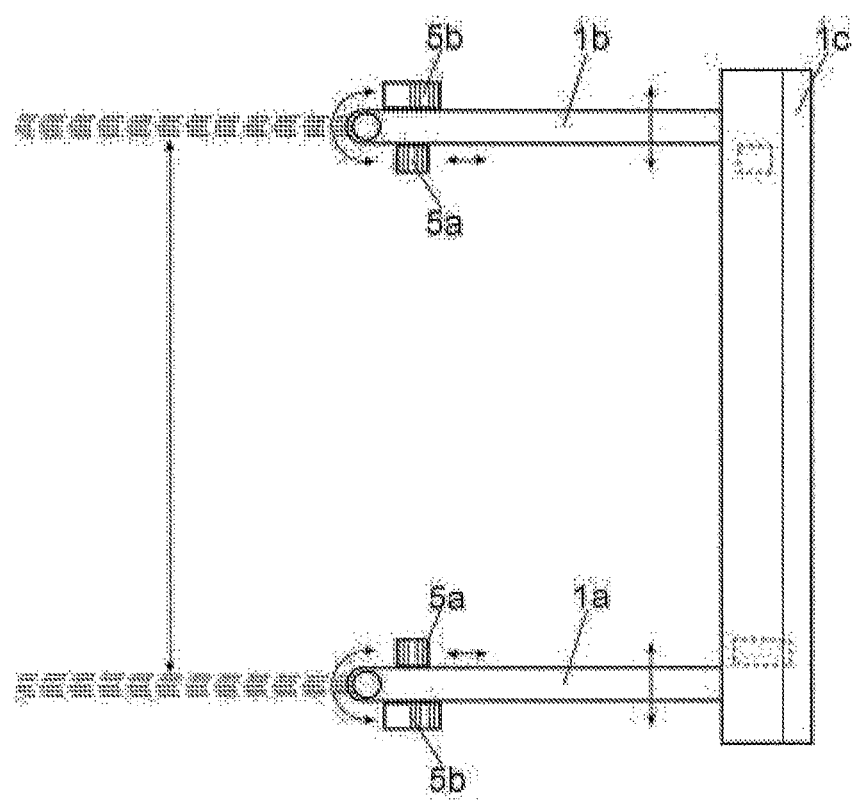

VARIABLE WIDTH CENTRAL ALIGNMENT SYSTEM WITH BLOCKING OF REVERSE AND FORWARD MOVEMENT OF TRUCKS FOR LOADING BAYS

OBJECT OF THE INVENTION

The present invention refers to a variable width central alignment system with blocking of reverse and forward movement of trucks for loading bays, and especially loading bays that have a fold-away ramp, designed to create an area through which to pass between the truck box body and the loading and unloading area, and shelters to close off the space at the side and at the top in the area through which to pass.

ANTECEDENTS OF THE INVENTION

Loading bays generally have means to facilitate guiding of the truck as it is manoeuvred towards the loading bay, so that, when positioned correctly, the truck is aligned more or less centrally in relation to the loading bay. This is essential so that the fold-away ramp can be lowered into an operative position supported by the truck box body, creating an area through which to pass for the loading and unloading for goods.

These guiding measures generally consist of bars attached to the ground, the aim of which is to give the driver a reference as the truck is manoeuvred in reverse towards the loading bay.

As trucks can be of different width, the solutions adopted by all companies in the sector is to have these fixed bars or elements as a guide, separated by an adequate distance for trucks of large width to pass, and also ensuring narrower trucks can pass.

However, narrower trucks do not have an adequate reference for the axis of symmetry in the loading bay, and there is a very high possibility that the driver may use one of the bars or railings alongside as a reference, when manoeuvring the truck towards the loading bay, and that the truck is, therefore, not centrally aligned, preventing the fold-away platform of the loading bay being lowered.

Another disadvantage that occurs in manoeuvring the truck towards the loading bay is that the truck comes into contact with stops designed for this purpose in the loading bay.

In some cases, these stops are fixed and, in other cases, they have a certain range of movement in order to minimise damage to the stops and to the truck due to vertical movements affecting the truck during loading and unloading.

The problem with these stops is that they cause imperfections to the truck, which repeatedly comes into contact with the stops, and, although the stops have mobile, protective supports, the truck continues to scrape against the stops due to the repeated loading and unloading operations, causing damage to the stops and to the truck.

The arrangement of these reverse stops for the truck in the loading bay entails a risk whereby an operator could become trapped between the truck and the loading bay as the truck approaches the bay.

To block the truck, preventing it from moving when the loading bay platform is in place, supported against the truck box body, it is usual to place chocks to block the wheels of the truck.

DESCRIPTION OF THE INVENTION

The variable width central alignment system with blocking of reverse and forward movement of trucks for loading bays, the object of the invention, presents a series of construction specificities aimed at simultaneously resolving the problems outlined, and, specifically, to facilitate the guiding of the truck when approaching the loading bay, regardless of the width of the truck.

Another objective of the invention is to limit the reverse movement of the truck once it reaches a position close to the loading bay, without the truck coming into contact with the known stops, which in the case of the present invention, do not exist, preventing the damage that would otherwise occur to the truck and loading bay, and creating a safe area between the truck and the loading bay in order to prevent operators becoming entrapped.

Another objective of the invention is to allow chocks to be placed automatically on at least one of the wheels of the truck, once the truck has been manoeuvred towards the loading bay, to prevent movement during loading and unloading.

As a result, the system of the invention comprises at least one longitudinal guide independent of the loading bay, arranged on one of the sides of the vertical midplane of the loading bay, opposite the plane defined by the loading bay and associated to actuating means, which cause its side displacement, so that at least one longitudinal guide forms a reference, in this way, to guide the truck as it is manoeuvred towards the loading bay.

In a variation of the setup, the system is comprised of two longitudinal, parallel guides, independent of the loading bay, arranged symmetrically in relation to the midplane of the loading bay, and associated to actuating means that cause it to move crossways and in opposite directions to define an area of variable width for trucks to pass.

The separation to a greater or lesser extent of the longitudinal guides enables the width of the area through which to pass, to be adjusted to the dimensions of the truck, guaranteeing the guiding of the truck into a centrally aligned position in relation to the axis of symmetry of the loading bay, regardless of the width of the truck.

It is necessary to mention that the actuating means of the longitudinal guides can be mechanical, electrical, pneumatic, hydraulic or of any other type, as this does not affect the functionality of the guides.

In accordance with the invention, and in order to facilitate, to a greater extent, the manoeuvre of the truck towards the loading bay, at least one longitudinal guide can comprise a vertical post with light-signalling means, providing the driver with visual information to guide the truck as it is manoeuvred towards the loading bay. The arrangement of this vertical post on a longitudinal guide enables this vertical post to move vertically, along with the guide, guaranteeing that the vertical post and the light-signalling means set on the post remain in a visible position for the driver, regardless of the position of the aforementioned longitudinal guide and the width of the truck.

The aforementioned vertical post has height detectors in its upper part, which provide information on the height of the truck as it approaches the loading bay. The height of the truck normally conditions its width, leading to a variation in width between the longitudinal guides and providing, in this way, the space to guarantee the truck is aligned centrally in relation to the loading bay.

In the area located in front of the longitudinal guides, there are guiding bands or lines to facilitate guiding of the truck as it approaches the longitudinal guide or guides.

These guiding lines define a measurement for trucks of a certain width through their interior area, and a measurement for wider trucks through their exterior area.

In a setup example, these guiding lines are defined by beams of light, preferably laser or similar, projected by lighting devices arranged on at least one of the longitudinal guides.

In accordance with the invention, at least one longitudinal guide comprises a chock at the back and one at the front, connected to actuating and blocking means for it to move along the longitudinal guide, to be placed in a position to block the truck, once the truck is in the loading bay.

As the truck approaches the loading bay, the chock at the back is pushed by the back wheels of the truck, causing it to move due to the action of the wheels, and the chock at the back is blocked when it reaches a stipulated stationary position, preventing the truck from continuing to reverse and, in this way, preventing it from knocking against the loading bay. This defines a safe, non-impact area and subsequently enables the front stop to block the wheels of the truck to immobilise it during loading and unloading.

The actuating means of at least the chock at the back are associated to a contact sensor located in the front part of the loading bay, and it blocks the chock at the back when the truck reaches the maximum distance when approaching the loading bay.

The aforementioned sensor provides a stationary area, by means of the chock at the back of the longitudinal guide, which prevents the truck getting excessively close to the loading bay and knocking into it, defining the stationary point, with a certain limit permitted by the mechanism, in which the loading bay is operative.

The possibility of longitudinal displacement of the chocks enables the truck to be immobilised, acting on at least one of the back wheels of the truck, in the adequate position for the back end of the truck to be a certain distance from the loading bay, regardless of the length existing between the back wheel and the back end of the truck.

In a setup of the invention, the actuating means and blocking of the front chock are connected to a contact sensor located at the front of the loading bay, which causes the displacement of this front chock towards the loading bay, until one of the truck's wheels comes into contact with the front area.

The aforementioned sensor means that, if the system to block the stops on the longitudinal guides fails, and the signal of the presence of the truck box body is not intercepted, due to the movement of the truck, a danger warning is given, through a sound and/or light signal, blocking the system to prevent the transfer of goods between the truck and the platform, in order to prevent accidents during loading/unloading.

In a variation of the setup, the actuating means of the front chock are associated to the control means of the fold-away ramp of the loading bay, so that when the fold-away ramp is lowered to an operative position supported against the truck box body, the front chock moves closer to the loading bay until it acts against the wheel of the truck, which is blocked between the front and back chocks. In this setup, when the fold-away ramp is raised, the front chock moves towards the front area of the guide, arranging itself in an inoperative position so that the truck is able to exit.

The invention has also been designed so that the actuating means of the front chocks in a reverse and forward direction can be caused, respectively, by the contact sensor located at the front of the loading bay and by the control to raise the fold-away ramp, so that when the truck comes into contact with the aforementioned contact sensor, the front chocks move towards the back area to block the wheel, and when the fold-away ramp is raised, once the loading and unloading is complete, the front chocks move forward towards an inoperative front position.

In a setup of the invention, the longitudinal guides both have diverging sections at their front end that enable the front chocks to branch off as they move forward, so that they are out of the way of the trajectory of the wheels of the truck when it leaves the loading bay.

These possible setups of the actuating means of the front and back chocks are merely illustrative, as technicians in this field could use other setups, such as simple control buttons situated outside the area in which the truck moves, without being inventive.

The invention system, by blocking the truck using the aforementioned chocks, makes it possible to dispense with the usual stops, creating a safety area between the truck and the loading bay, preventing operators becoming trapped in this area. Furthermore, by not requiring the usual system of impact stops in the loading bay, wear, tear and breakage of the stops, and imperfections caused to the truck are prevented during loading/unloading.

In a possible setup example, the actuating and blocking means of the back chocks are both comprised of hydraulic cylinders that act on the drag chains, conveniently guided, to which the back chocks are attached.

Equally, in this setup example, the actuating means and blocking of the front chocks are both comprised of hydraulic cylinders that act on the drag chains, conveniently guided, to which the front chocks are attached.

In a setup of the invention, the back chock is jointly associated, and at a certain distance from the front chock, through one or more actuating means, in its reverse movement, and the front chock can continue to move forward towards the front area of the truck's wheel once the back chock is blocked.

In accordance with the invention, the longitudinal guide or guides are associated at the back end, to a safety stop placed crossways on the guides, to stop the truck in case of failure or breakage of the back chock, guaranteeing and defining a safety area between the truck and the loading bay.

This safety stop, in a setup of the invention, features a front space to house the back chock at the end of its trajectory, as the truck reverses for loading and unloading.

DESCRIPTION OF DIAGRAMS

To complete the description and facilitate understanding of the different features of the invention, the present descriptive report includes a set of illustrative but not limiting diagrams in which the following can be seen:

Diagram 1 shows a view from above of a setup example of the invention system with two parallel, longitudinal guides, in which the longitudinal guides are shown with a dashed line when they are in a position of maximum separation and a continuous line when they are closest together. In the setup, the symmetrical arrangement of the longitudinal guides in relation to the loading bay can also be observed, the vertical post holding the signalling means, set on one of the longitudinal guides, and the guiding bands or lines arranged in front of the longitudinal guides.

Diagram 2 shows a front view from above of the invention system located in front of a loading bay.

Diagram 3 shows a side view of one of the longitudinal guides as the truck manoeuvres towards the loading bay, moving the back chock towards the back area of the longitudinal guide.

Diagram 4 shows a similar view to the previous diagram, in which the truck has actuated the contact sensor located at the front of the loading bay and responsible for blocking the back chocks to prevent the truck reversing. In this diagram, the front chock is shown in movement, activated by the actuating control of the fold-away ramp in the loading bay.

Diagram 5 shows a similar view to the previous diagram, in which the front chock acts on the truck's wheel, holding it in the loading bay.

Diagram 6 shows a horizontal cross-section view from above of one of the guides, in the interior of which, both setup examples can be observed of the actuating means for the back chock and front chock, arranged at different heights.

Diagrams 7 and 8 both show top and side views of the longitudinal guides associated, at the back end, to a safety stop with a lighting device to project beams of light that define the guiding lines.

PREFERRED SETUP OF THE INVENTION

In the setup example shown in the diagrams attached, the variable width central alignment system with blocking of reverse and forward movement of trucks for loading bays, comprises two parallel, longitudinal guides (1a, 1b), independent of the loading bay, arranged symmetrically in relation to the midplane of the loading bay, and associated to actuating means (2) that allow movement crossways and in opposite directions to create an area of variable width for trucks to pass towards the loading bay (MC). These actuating means can involve, for example, operable cylinders with pressure fluid or mechanical or electrical pushers, although the use of actuating means of any other type should not be ruled out.

The longitudinal guide (1a) comprises a vertical post (3) that presents light-signalling means (31) on its front side, which provide the driver with visual information to guide the driver as the truck is manoeuvred towards the loading bay.

This vertical post (3) has height detectors (32) in its upper section that send information about the height of the truck to the loading bay (MC) as the truck approaches the bay, creating a variation in width between the longitudinal guides (1a and 1b) and thereby leaving a space that ensures the truck is centrally aligned with the loading bay (MC).

To facilitate the guiding of trucks to the area through which to pass, defined by the guides (1a, 1b), the system comprises guiding bands or lines (4a, 4b) situated in front of the longitudinal guides (1a, 1b). These guiding bands or lines (4a, 4b) can be stuck to the ground or simply painted on the ground.

In a setup example, to facilitate the guiding, the area through which to pass, defined by the guides (1a, 1b), comprises a front area defined by both guiding lines formed by adequate light, for example, laser (8), that facilitates visibility at night and at times of limited visibility, such as in foggy conditions, and enables the guides to move and adapt to the width of the truck in each case. This system would prevent the need to maintain painted lines currently used as guides.

In the setup example shown, each of the longitudinal guides (1a, 1b) comprises a back chock (5a) and a front chock (5b) connected to actuating and blocking means for displacement along the longitudinal guides (1a, 1b), and to block the truck (C) positioned in the loading bay (MC).

The actuating and blocking means for the back and front chocks (5a, 5b) can present multiple configurations and forms.

Specifically, in the example shown, the chocks (5a, 5b) are set on tracks (11) of the longitudinal guides (1a, 1b) with the possibility for longitudinal displacement.

The back chock (5a), as a form of roller, is initially moved towards the front area of the respective longitudinal guides (1a, 1b) as shown in diagram 1, and, when a truck manoeuvres towards the loading bay, passing through the area defined by the longitudinal guides (1a, 1b), the back wheels (R) of the truck push the back chocks (5a), moving them towards the back area of the longitudinal guides as shown in diagram 3.

When the truck comes into contact with the contact sensor (6) located at the front of the loading bay (MC), as shown in diagram 4, the contact sensor (6) activates the means for blocking the back chocks (5a), preventing the truck from moving further towards the loading bay. These blocking and actuating means for the back chocks (5a) are represented schematically in the setup example in diagram 6, by hydraulic cylinders (51) that act on the drag chains (51a), conveniently guided and connected to the respective back chocks (5a).

The front chocks (5b) are also connected to actuating and blocking means shown schematically in diagram 6 by hydraulic cylinders (52) that act on the drag chains (52a), conveniently guided, and responsible for moving them towards the back area of the longitudinal guides as shown in diagram 4, until they come into contact with the wheel of the truck to prevent the truck positioned in the loading bay (MC) from moving, as shown in diagram 5.

The actuating means of the front chocks (5b) are activated by control buttons (7) that can be inside the loading bay area or on the column (3) as shown in the setup example in diagram 2, so that the prior blocking of the wheels is conditioned on activating the loading bay (MC).

In this setup example, the activation of the actuating means of the front chocks in the opposite direction is caused by the control device that raises the fold-away ramp (RA). In this way, when the fold-away ramp is raised, the front chocks (5b) return to the initial position, enabling the truck to leave, and when the truck no longer acts on the contact sensor (6), the sensor causes the actuating means of the back chocks (51) to move and return to their initial position.

Obviously this solution requires appropriate electrical connections between the hydraulic control centre responsible for supplying hydraulic fluid to the actuating means of the chocks, the contact sensor (6), the control button (7), and the control device for the fold-away ramp of the loading bay.

In the example shown, the longitudinal guides (1a, 1b) both have diverging sections (12) at the front end, that allow the front chocks (5b) to branch off as they move forward, into the position shown in diagram 1, so that they are outside the trajectory of the wheels (R) of the truck when it leaves the loading bay.

In the example shown in diagrams 7 and 8, the longitudinal guides (1a, 1b) have a safety stop (1c) at the back end, that is perpendicular to the guides and parallel to the loading bay, located at a distance from the loading bay that means that, in the hypothetical case that the truck destabilises the blocking of the back chock (5a) when reversing, or that the back chock does not work for any reason, the truck cannot pass beyond the safety stop (1c), maintaining a safe, non-impact area and preventing the truck coming into contact with the shed.

In diagrams 7 and 8, the lighting guides have a lighting device (8) to project light beams, preferably laser, which define the guiding lines for the truck.

These lighting devices (8) require very little maintenance, they facilitate visibility of the guiding lines at night and at times of low visibility, such as in foggy conditions, and they make it possible for the guiding lines to move, adapting to the width of the truck in each case.

Having described in sufficient detail the nature of the invention, and provided an example of preferential use, it is stated for relevant purposes that the materials, shape, size and arrangement of the elements described can be modified, as long as they do not suppose an alteration of the essential features of the invention which are outlined below.

The invention claimed is:

1. System for blocking of reverse and forward movement of trucks at a loading bay comprising:

a guided back chock movable by a push action of a back wheel of a truck, from an initial position to a stationary position to block said truck once the truck is in said loading bay, preventing the truck from continuing a reverse movement;

a guided front chock movable from a position placed out of the way of the trajectory of the wheels of the truck to a position to block the truck, once the truck is in the loading bay;

blocking means connected to said back chock to block the back chock at the stationary position, and connected to said front chock to block said front chock at said position to block the truck;

wherein actuating means are connected to said back chock and to said front chock to actuate their movement along a longitudinal guide;

said longitudinal guide comprises said back chock, said front chock, said blocking means and said actuating means;

said longitudinal guide being independent of the loading bay, and arranged on one side of a vertical midplane of the loading bay, opposite a plane defined by the loading bay and associated with actuating means that cause a longitudinal guide side displacement, so that at least one longitudinal guide forms a reference for guiding the truck as it is manoeuvred towards the loading bay.

2. System, according to claim 1, wherein the system comprises two of said longitudinal guides parallel and independent of the loading bay, arranged symmetrically in relation to the vertical midplane of the loading bay, and associated with actuating means that cause their side displacement and in opposite directions; the longitudinal guides defining an area of variable width for trucks to pass, each of said guides comprising a back chock, a front chock and blocking means.

3. System, according to claim 2, wherein at least one of the longitudinal guides comprises a vertical post that presents light-signalling means on its front side, which provide visual information for guiding the truck as it is manoeuvred towards the loading bay.

4. System, according to claim 3, wherein in an upper part of the vertical post, there are height and width detectors for the truck approaching the loading bay, and the detectors are connected to the actuating means of the longitudinal guides in a crossways direction, adapting their position to the width of the truck.

5. System, according to claim 2, wherein the system comprises guiding bands or lines arranged in an area, situated in front of at least one of the longitudinal guides, which form a visual reference to facilitate guiding the truck as it approaches the longitudinal guides.

6. System, according to claim 5, wherein the guiding bands are lighting guides defined by beams of light projected by lighting devices arranged on at least one of the longitudinal guides.

7. System, according to claim 2, wherein the longitudinal guides have a diverging section at the front end that enables the front chocks to branch off as they move forward until said front chocks are emplaced outside the trajectory of the back wheels of the truck when the truck leaves the loading bay.

8. System, according to claim 2, wherein the actuating means and the blocking means for each back chock are formed by hydraulic cylinders that act upon guided drag chains to which each back chock is attached.

9. System, according to claim 2, wherein the actuating and blocking means for each front chock are both formed by hydraulic cylinders that act upon guided drag chains to which each front chock is attached.

10. System, according to claim 1, wherein the actuating means and the blocking means for the front chock are connected to a contact sensor located at the front of the loading bay, and which can enable displacement of the front chock towards the loading bay until it comes into contact with the front area of one wheel of the truck.

11. System, according to claim 1, wherein the actuating means and the blocking means for the front chock are connected to control means for a fold-away ramp of the loading bay, which causes said chock to move to an inoperative position when the fold-away ramp of the loading bay is raised.

12. System, according to claim 1, wherein the actuating means for the front chock is a control button.

13. System, according to claim 1, wherein the back chock is associated to the front chock and associated at a certain distance from the front chock when said front chock moves backwards using the actuating means, and wherein the front chock continues moving backwards towards the wheel of the truck once the back chock is blocked.

14. System, according to claim 1, wherein a contact sensor is located at the front part of the loading bay, and said blocking means and said actuating means, connected to said back chock or front chock, are configured to be activated by said contact sensor, for moving at least the back chock to a block position, when the back end of the truck is a certain distance from the loading bay, regardless of the length existing between the back wheel and a back end of the truck.

15. System, according to claim 1, wherein said back chock and said front chock are actuated by independent actuating means.

* * * * *